United States Patent
Bonnet

(10) Patent No.: US 10,581,528 B2
(45) Date of Patent: Mar. 3, 2020

(54) METHOD FOR TRANSMITTING DATA ASYNCHRONOUSLY FROM AN ELECTRONIC DEVICE TO AN ELECTRONIC WATCH

(71) Applicant: ETA SA Manufacture Horlogere Suisse, Grenchen (CH)

(72) Inventor: Thierry Bonnet, Geneva (CH)

(73) Assignee: ETA SA Manufacture Horlogere Suisse, Grenchen (CH)

( * ) Notice: Subject to any disclaimer, the term of this patent is extended or adjusted under 35 U.S.C. 154(b) by 35 days.

(21) Appl. No.: 15/946,279

(22) Filed: Apr. 5, 2018

(65) Prior Publication Data

US 2018/0309521 A1 Oct. 25, 2018

(30) Foreign Application Priority Data

Apr. 25, 2017 (EP) ..................................... 17167994

(51) Int. Cl.
*H04B 10/54* (2013.01)
*G04G 21/00* (2010.01)
(Continued)

(52) U.S. Cl.
CPC ............ *H04B 10/541* (2013.01); *G04C 11/02* (2013.01); *G04G 5/00* (2013.01); *G04G 21/00* (2013.01);
(Continued)

(58) Field of Classification Search
CPC ................. H04B 10/541; H04B 10/114; H04B 10/1143; H04B 10/6165; H04B 10/2575;
(Continued)

(56) References Cited

U.S. PATENT DOCUMENTS 7,437,077 B2 * 10/2008 Wirth ..................... G02B 26/06
250/201.9
9,993,200 B2 * 6/2018 Jeong .................... G06F 1/1684
(Continued)

FOREIGN PATENT DOCUMENTS

| EP | 1 968 215 A2 | 9/2008 |
|---|---|---|
| EP | 2 903 187 A1 | 8/2015 |
| GB | 2524523 A | 9/2015 |

OTHER PUBLICATIONS

European Search Report dated Oct. 3, 2017 in European Application 17167994.7 filed on Apr. 25, 2017 (with English Translation of Categories of Cited Documents).

*Primary Examiner* — Abbas H Alagheband
(74) *Attorney, Agent, or Firm* — Oblon, McClelland, Maier & Neustadt, L.L.P.

(57) ABSTRACT

A method for transmitting data from an electronic device to an electronic watch is provided, including emitting a first sequence of light signals with a first light source of the device at a light-intensity level among at least four light-intensity levels, the emitted first sequence corresponding to a code of data to be transmitted; emitting a second sequence of light signals at two light-intensity levels corresponding to clock phases, simultaneously to the emitted first sequence, with a second light source of the device; detecting successive light-intensity levels with a first phototransistor of a watch, to reconstitute a sequence of data; detecting a succession of the two light-intensity levels with a second phototransistor of the watch, to reconstitute the clock phases, the first and the second sequences emitted at two distinct wavelengths; and decoding the sequence of data by a sequence of the clock phases to reconstitute the data.

10 Claims, 2 Drawing Sheets

(51) Int. Cl.
*H04B 10/114* (2013.01)
*H04N 7/22* (2006.01)
*H04B 10/61* (2013.01)
*G04R 20/26* (2013.01)
*G04G 21/04* (2013.01)
*G04C 11/00* (2006.01)
*G04G 5/00* (2013.01)

(52) U.S. Cl.
CPC ............. *G04G 21/04* (2013.01); *G04R 20/26* (2013.01); *H04B 10/114* (2013.01); *H04B 10/1143* (2013.01); *H04B 10/6165* (2013.01); *H04N 7/22* (2013.01)

(58) Field of Classification Search
CPC .... H04B 10/505; H04B 10/532; G04C 11/02; G04C 10/02; G04C 9/00; G04G 5/00; G04G 21/00; G04G 21/04; G04G 19/00; G04R 20/26; G04R 20/28; G04R 20/30; H04N 7/22; G04B 47/00; G04D 7/002; H04L 27/36
USPC ......................................................... 398/131
See application file for complete search history.

(56) References Cited

U.S. PATENT DOCUMENTS

| | | | |
|---|---|---|---|
| 2005/0147178 A1* | 7/2005 | Kikuchi | H03M 5/20 375/288 |
| 2008/0219675 A1* | 9/2008 | Yano | H04B 10/505 398/140 |
| 2014/0119734 A1* | 5/2014 | Lundgren | H04W 76/10 398/115 |
| 2015/0222359 A1* | 8/2015 | Kai | H04B 10/2575 398/115 |
| 2016/0100758 A1* | 4/2016 | Jeong | G06F 1/1684 340/870.07 |
| 2016/0266554 A1* | 9/2016 | Ogasawara | G04R 20/26 |
| 2016/0299475 A1* | 10/2016 | Baba | H04B 5/0081 |
| 2017/0104932 A1* | 4/2017 | Jiang | H04N 5/23229 |
| 2017/0118639 A1* | 4/2017 | Beale | G06F 21/34 |
| 2018/0022351 A1* | 1/2018 | Habu | B60W 30/12 701/96 |
| 2018/0061309 A1* | 3/2018 | Bae | G04R 40/06 |
| 2018/0116532 A1* | 5/2018 | Han | A61B 5/0261 |
| 2018/0191192 A1* | 7/2018 | Yang | H02J 7/355 |

* cited by examiner

METHOD FOR TRANSMITTING DATA ASYNCHRONOUSLY FROM AN ELECTRONIC DEVICE TO AN ELECTRONIC WATCH

This application claims priority from European Patent Application No. 17167994.7 filed on Apr. 25, 2017; the entire disclosure of which is incorporated herein by reference

TECHNICAL FIELD

The present invention relates to the field of electronic watches. It more particularly relates to a method for transmitting data from an electronic device to an electronic watch.

PRIOR ART

The watches referred to as "connected" watches, which are able to communicate with an electronic device such as a smart phone, have, over the last few years, become impossible to ignore in the business of horology. Such a watch may be adjusted manually, in particular via activation of pushbuttons, of crowns and/or of touch controls, this being relatively constraining for the user or the after-sales service tasked with the adjustment.

To avoid these drawbacks, it is now possible to adjust an electronic watch automatically, by equipping it with devices supporting the Bluetooth Low Energy technology or another near-field communication technology. However, these devices are quite complex to implement and require specific communication means and in particular antennae to be incorporated both into the electronic device and into the watch. They must also be certified, this occasioning an additional cost.

In patent application EP16157655, a new way of transferring adjustment data to an electronic watch from an electronic device, typically a smart phone, is proposed, this way of transferring adjustment data being simpler and less expensive than the aforementioned solutions. To allow data to be transferred, the watch includes a phototransistor intended to detect light signals originating from a light source of the electronic device. These light signals encode data by way of a two-state modulation, the two states being the presence or absence of light. However this type of bipolar optical modulation has the drawback of allowing only relatively low transmission rates.

SUMMARY OF THE INVENTION

The aim of the present invention is to remedy the drawbacks presented in the preceding section, by providing an improved optical transmission method.

To this end, the invention relates to a method for transmitting data from an electronic device to an electronic watch, including the following steps:
  emitting a sequence of light signals with a light source of the electronic device, each signal having a light-intensity level belonging to a set of at least four light-intensity levels, said sequence corresponding to a code of the data to be transmitted;
  detecting successive light-intensity levels with a phototransistor of the watch, so as to reconstitute the sequence of data; and
  decoding the sequence in order to reconstitute the data.

Since the data are encoded in the form of light signals having at least four states, the signals will be said to encode these data via an optical modulation with a least four levels, this modulation being referred to, more simply, as a multi-level optical modulation. By multi, what is therefore meant is a least four.

This method has the advantage of being able to be implemented mainly automatically, without the user having to perform a complex adjustment via crowns, pushbuttons or touch controls for example. Naturally, the method must be initiated, this possibly being done either manually by pressing on a pushbutton, or automatically, for example via a system that is in standby by default and that turns on reception of a certain sequence of flashes. The automatic transmission of data between the electronic device and the electronic watch makes it much easier to program the watch. It also allows the errors or imprecision resulting from a manual configuration to be avoided. It makes it possible for the user to use the more user-friendly interface of the electronic device, typically an application of a smart phone, to select and configure the data to transfer to the watch. All sorts of data may be transmitted by this means, including short messages if the watch has a display functionality. Thus, any of the following may be easily done: the time may be set, the time may be changed, an alarm may be set, the date may be set, or other information such as the phases of the moon, tide times and tidal coefficients, sunset and sunrise times, etc. may be transmitted.

Furthermore, this method has the advantage of not requiring communication antennae (which are expensive, bulky and sometimes incompatible with metal external parts) to be incorporated into the frame or electronic device, the system for communicating optically between the watch and the electronic device consisting merely of a point light source of the light-emitting-diode type and of an optical sensor of the phototransistor type.

Lastly, the method according to the invention is particularly advantageous in that it allows asynchronous transmission at a higher rate than in the case of a bipolar optical modulation.

Emitting light signals at at least four light-intensity levels allows the transmission to be accelerated. Specifically, instead of detecting whether the light source is turned on or turned off as is the case in patent application EP16157655, i.e. of detecting intensity levels among two possibilities, the light-intensity level of said source is detected among at least four possibilities. The rate is therefore at least doubled (in particular, it is doubled if the light source can emit four and only four different light-intensity levels).

Furthermore, the method includes a step of emitting a sequence of light signals at two intensity levels corresponding to clock phases, simultaneously to the step of emitting the sequence of light signals corresponding to the data to be transmitted, with a second light source of the electronic device, and a step of detecting a succession of two light-intensity levels with a second phototransistor of the watch, so as to reconstitute the clock, the two sequences of light signals being emitted at two distinct wavelengths. Naturally, the clock is used in the step of decoding the sequence of data.

The method according to the invention may comprise one or a technically possible combination of the following features.

In one nonlimiting embodiment, the detecting step furthermore includes a re-synchronizing substep consisting in resetting a counter of sampling periods of the watch on detection of a brightness change by the phototransistor and provided that the sampling periods that have been counted by the counter are comprised between two threshold values.

In one nonlimiting embodiment, the light-intensity levels of the set are regularly distributed over a brightness scale.

In one nonlimiting embodiment, the method includes an additional step of generating feedback on the transmission.

In one nonlimiting embodiment, the step of generating feedback on the transmission comprises emitting a light signal with a light-emitting diode of the watch.

In one nonlimiting embodiment, the step of generating feedback on the transmission comprises positioning displaying means of the watch.

In one nonlimiting embodiment, the method comprises an additional step of analysing an image of the dial of the watch, this image being taken by a video camera of the electronic device following the positioning of the displaying means of the watch.

In one nonlimiting embodiment, the electronic device is portable, and in particular a smart phone or an electronic tablet.

By "portable electronic device", what is meant is an electronic device, also called a user terminal, capable of being carried and transported by a user, and of remaining functional during its transportation. This is for example the case of a smart phone. Naturally, devices requiring a mains supply, for example desktop computers, are excluded from this definition. Combinations of devices, for example a portable computer to which a peripheral is connected by a wireless or wired link, are also excluded from this definition.

This method has the advantage of requiring very little hardware: a portable device of the smart-phone type with a suitable mobile application is all that is required to implement it. The method does not require dedicated hardware, such as a sensor to be plugged into a computer, or bulky hardware to be used. Anybody (for example a horologist) with a smart phone having the right application could implement the method.

In one nonlimiting embodiment, the light source is a zone of a display screen of the electronic device.

In one nonlimiting embodiment, the light source is a light-emitting diode that also serves as a flash for the electronic device.

BRIEF DESCRIPTION OF THE FIGURES

Details of the invention will become more clearly apparent on reading the following description, which is given with reference to the appended drawings, in which.

DETAILED DESCRIPTION

Figure 1:
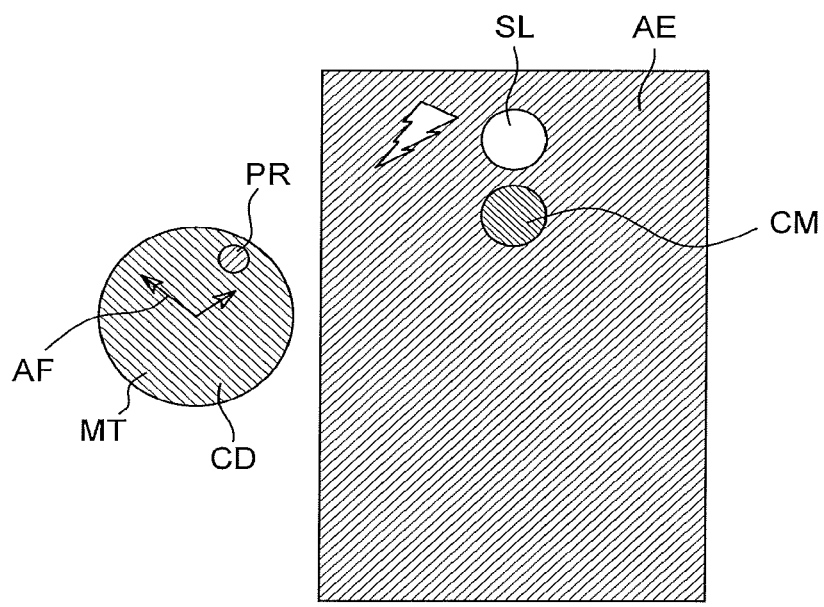
FIG. 1 shows a watch, seen dial-side, receiving, via a phototransistor, a light signal emitted by a light-emitting diode of a smart phone, said diode also being used as a flash in said smart phone, said smart phone being seen rear-side.
Figure 2:
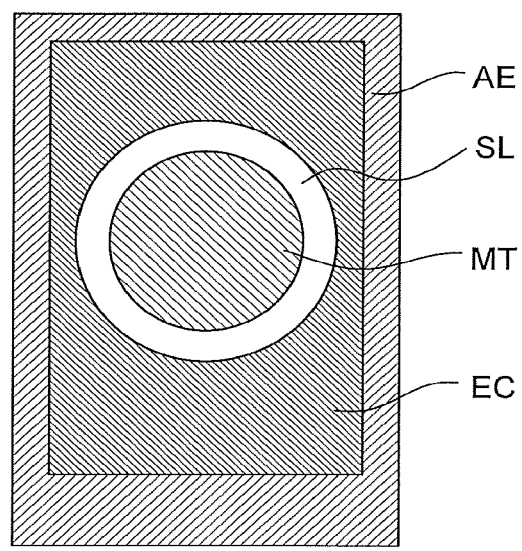
FIG. 2 shows a watch, seen back-side, receiving, via a phototransistor, a light signal emitted by a section of a smart phone screen, the phototransistor being positioned facing said section, the smart phone being seen screen-side.
Figure 4:
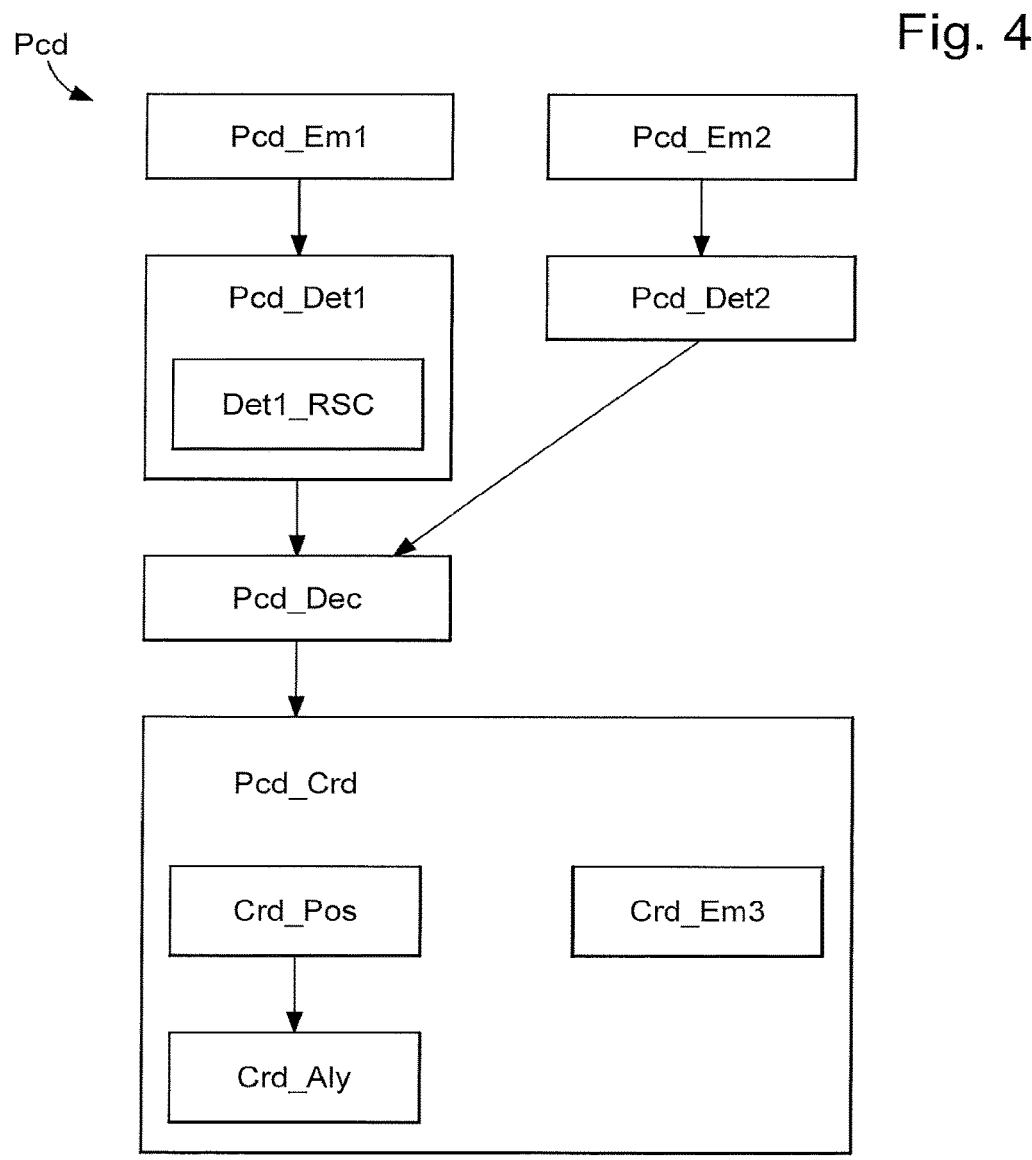
FIG. 4 shows the steps of the method according to one embodiment of the invention.

FIGS. 1 and 2 show an electronic watch MT and an electronic device AE that are suitable for implementing the method for transferring data according to the invention, which method is shown in FIG. 4. More particularly, the watch MT is equipped with a phototransistor PR that is connected to a microcontroller (not shown) of the watch MT. The transmitting method consists in emitting (step Em1) a sequence of light signals with a light source SL of the electronic device AE at at least four distinct light-intensity levels, in receiving (step Pcd_Det1, Det1_Rsc) the sequence of light signals with the phototransistor PR of the watch MT, and in converting (step Pcd_Dec) the received sequence into an exploitable signal.

In a first configuration shown in FIG. 1, the phototransistor PR is located under the dial CD of the frame watch MT, facing an aperture that lets light pass. In another configuration, the phototransistor PR is located on the side of the back of the watch MT, which is at least partially transparent in order to let light pass or that possesses a removable hatch. Naturally, many other configurations may be envisaged.

Data are transferred from the electronic device AE via the light source SL, for example a flash or a screen EC of said device AE. In the configuration shown in FIG. 1, the electronic device AE is a smart phone and the light signals are emitted via the flash of the smart phone, which forms the light source. Since the flash is located on the rear of the device, it is possible to use the screen EC of the device AE to manage the transferring application using the screen EC of the smart phone during the transfer of data, while also visually monitoring the modifications made to the display of the watch MT.

In the configuration shown in FIG. 2, the electronic device AE is a smart phone and the light signals are emitted via the screen EC of the smart phone. More precisely, the screen EC includes a disc-shaped zone the level of brightness of which is uniform, said zone forming the light source SL. The watch MT is placed directly against or opposite the screen EC of the smart phone, facing the luminous disc. In this case, the application must be configured before the transfer is carried out and, if the dial CD of the watch MTV is not visible, a step of inspecting the transfer of data must be carried out after the operation. This configuration has the advantage of being less prone to disruption by exterior light sources than the configuration of FIG. 1.

In one variant implementation of the preceding configuration, the screen EC may be split into two zones in order to limit the scope of the light source to one of the zones of the screen EC. The remaining zone of the screen EC is reserved for the user interface of the application controlling the transfer of data. The transmission of data and the inspection of its execution are thus made easier.

It will be noted that the electronic device AE shown is of portable type, but it could alternatively be a peripheral connected to a desktop computer, for example by a USB link, this peripheral comprising a light source such as described in the preceding paragraphs (a light-emitting diode or a section of a screen of the peripheral). This variant has the advantage of making it possible to increase the symbol rate, which could be limited by the performance of portable electronic devices of the smart-phone type.

The data may be transferred using various types of optical modulation. As mentioned above, a bipolar modulation of NRZ type is easy to implement but has a limited performance. It is therefore advantageous to take advantage of the possibilities offered by the screens or flashes of smart phones (or more generally the screens or flashes of portable electronic devices) to realize a multilevel optical modulation. Specifically, recent flashes and screens are generally able to emit at at least 4 distinct light-intensity levels (one level of which may for example correspond to the "no emission of light" state).

Moreover, it is advantageous to choose, for the watch MT, a sampling frequency that is much higher than the theoretical emission frequency of the electronic device AE, so as to allow for possible variations in the period of the emissions. Typically, the sampling frequency is chosen to be 16 times higher than the emission frequency.

Furthermore, the method according to the invention advantageously comprises a re-synchronizing step that implements a counter of sampling periods of the watch MT. In the case of a sampling frequency 16 times higher than the emission frequency, no transition (from 0 to 1, or vice versa) should be detected during the 8 first sampling periods counted by the counter. If such a transition is detected, it is interpreted as an error. This kind of error for example results from a scintillation of the light source that is wrongly interpreted as a change in level. In contrast, a transition is expected in the 12 sampling periods following the first 8 sampling periods. If such a transition is detected, then the preceding bit is recorded and the counter is reset to its initial value.

In addition, when no transition is detected over many sampling periods, there is a risk that the emitting electronic device AE and the receiving watch MT will de-synchronize because of instability in the emission frequency of the coded signal. It is advantageous in this case to use the bit stuffing technique, which consists in adding fictive transitions that allow the receiver to be regularly resynchronized with the emitter. For example, in a transmission of a long series of bits of zero value, a bit of value one is inserted after a series of five zeros. At the receiver end, the procedure is inverted: after detection of five successive bits of zero value, it is expected to detect a bit of value one. If this is not the case, it is determined that an error has occurred. If this is the case, the bit of value one is not taken into account in the decoding and the counter is reset.

Figure 3:
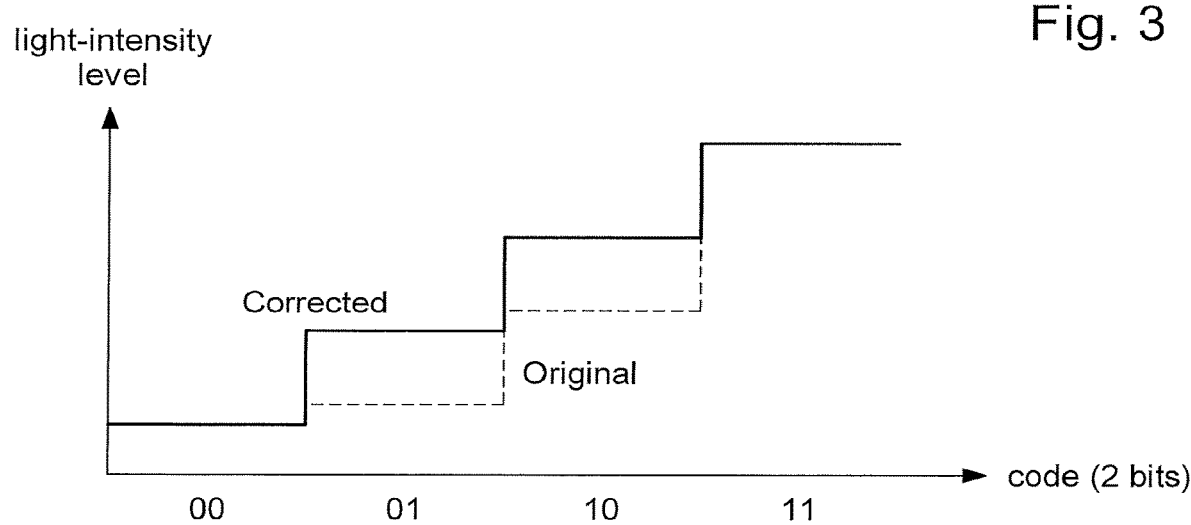
FIG. 3 shows light-intensity levels emitted by a light source of a portable electronic device, before and after a calibrating step of the method according to one embodiment of the invention.

According to one embodiment of the method according to the invention, the transmitting method includes a step of calibrating the light-intensity levels emitted by the light source of the watch MT. These levels are calibrated such that they are regularly distributed with respect to a brightness scale, i.e. such that the brightness difference between one level and the next remains constant. This step allows the distinction of the various brightness levels to be optimized in order to avoid reading errors on the part of the receiver. An example is shown in FIG. 3. This figure shows brightness levels as a function of the data to be encoded, before calibration (curve referenced "original") and after calibration (curve referenced "corrected").

Furthermore, the watch MT is equipped with two phototransistors that are able to receive distinct wavelengths, for example a wavelength corresponding to the blue for the first phototransistor and a wavelength corresponding to the red for the second phototransistor. Likewise, the electronic device AE is equipped with two light sources that are able to emit at these two wavelengths. In this case, one of the sources transmits the data asynchronously, whereas the other light source transmits (steps Pcd_Em2, Pcd_Det2) a clock signal, in order to allow the receiver to synchronize with the emitter.

In one embodiment, the method includes a step (step Pcd_Crd) of generating feedback on the transmission, the feedback being produced by the watch MT for the intention of the user or of the electronic device AE. For example, at the end of a transmitting operation, displaying means AF of the watch (for example the hour, minute and second hands of the watch) may be positioned (step Crd_Pos) such as to indicate the success or failure of the transmission. This particular position of the displaying means AF may be noted by the user who is thus informed of the outcome of the transmission. Alternatively, the electronic device AE may, by virtue of its video camera CM and image-analysing means, analyse (step Crd_Aly) the position of the displaying means AF of the watch MT and deduce therefrom whether the transmission was carried out correctly or not. It is also possible to add to the watch MT a light-emitting diode capable of emitting (step Crd_Em3), at the end of a transmission, a short sequence intended to be received by a phototransistor of the electronic device AE. Depending on the sequence, the electronic device AE may determine whether the transmission has executed correctly.

In conclusion, asynchronous multilevel optical transmission between an electronic device and a watch allows transmission rate to be increased. Naturally, those skilled in the art will be able to produce multiple variants of the presented embodiments without departing from the scope of the claims.

What is claimed is:

1. A method for transmitting data from an electronic device to an electronic watch, comprising:
    emitting a first sequence of light signals with a first light source of the electronic device; each signal having a light-intensity level belonging to a set of at least four light-intensity levels, the emitted first sequence of light signals corresponding to a code of data to be transmitted;
    emitting a second sequence of light signals at two light-intensity levels corresponding to clock phases, simultaneously to the step of emitting the first sequence of light signals corresponding to the code of the data to be transmitted, with a second light source of the electronic device;
    detecting successive light-intensity levels with a first phototransistor of a watch, so as to reconstitute a sequence of data;
    detecting a succession of the two light-intensity levels with a second phototransistor of the watch; so as to reconstitute the clock phases, the first and the second sequences of light signals being emitted at two distinct wavelengths,
    the detecting with the first phototransistor or the detecting with the second phototransistor including a re-synchronizing substep of resetting a counter of sampling periods of the watch upon detection of a brightness change by the first phototransistor or the second phototransistor, respectively, and provided that the sampling periods that have been counted by the counter are comprised between two threshold values; and
    decoding the sequence of data by a sequence of the clock phases, in order to reconstitute the data.

2. The transmitting method according to claim 1, light-intensity levels of the set being regularly distributed over a brightness scale.

3. The transmitting method according to claim 1, further comprising an additional step of generating feedback on transmission of the data.

4. The transmitting method according to claim 3, the step of generating the feedback on the transmission of the data comprising emitting a light signal with a light-emitting diode of the watch.

5. The transmitting method according to claim 3, the step of generating the feedback on the transmission of the data comprising positioning a displaying means of the watch.

6. The method according to claim 5, comprising an additional step of analysing an image of a dial of the watch, the image being taken by a video camera of the electronic device following the positioning of the displaying means of the watch.

7. The transmitting method according to claim 1, wherein the electronic device is portable.

8. The transmitting method according to claim 1, wherein one or both of the first light source and the second light source is a zone of a display screen of the electronic device.

9. The transmitting method according to claim 1, wherein one or both of the first light source and the second light source is a light-emitting diode that also serves as a flash for the electronic device.

10. The transmitting method according to claim 7, wherein the electronic device is a smart phone or a tablet.

\* \* \* \* \*